US012678890B2

(12) United States Patent (10) Patent No.: US 12,678,890 B2

Yagi (45) Date of Patent: Jul. 14, 2026

(54) CONTROL DEVICE FOR LASER MACHINING APPARATUS

(71) Applicant: FANUC CORPORATION, Yamanashi (JP)

(72) Inventor: Jun Yagi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 958 days.

(21) Appl. No.: 17/906,966

(22) PCT Filed: Mar. 24, 2021

(86) PCT No.: PCT/JP2021/012231

§ 371 (c)(1),
(2) Date: Sep. 21, 2022

(87) PCT Pub. No.: WO2021/200471

PCT Pub. Date: Oct. 7, 2021

(65) Prior Publication Data

US 2023/0109709 A1 Apr. 13, 2023

(30) Foreign Application Priority Data

Mar. 30, 2020 (JP) ................................. 2020-060172

(51) Int. Cl.
B23K 26/04 (2014.01)
G05B 19/402 (2006.01)

(52) U.S. Cl.
CPC ............ B23K 26/04 (2013.01); G05B 19/402 (2013.01); *G05B 2219/45165* (2013.01)

(58) Field of Classification Search
CPC .................. B23K 26/04; G05B 19/402; G05B 2219/45165

(Continued)

(56) References Cited

U.S. PATENT DOCUMENTS 6,823,230 B1 * 11/2004 Jamalabad ......... G05B 19/4099
700/182
2003/0200005 A1 * 10/2003 Hirai .................. G05B 19/4103
700/187

(Continued)

FOREIGN PATENT DOCUMENTS

DE 10 2008 030 783 B3 8/2009
DE 10 2011 082 834 A1 3/2013

(Continued)

OTHER PUBLICATIONS

International Search Report issued in PCT/JP2021/012231; mailed May 18, 2021.

*Primary Examiner* — Justin C Dodson
*Assistant Examiner* — Alba T Rosario-Aponte
(74) *Attorney, Agent, or Firm* — Studebaker Brackett PLLC

(57) ABSTRACT

Provided is a control device for a laser machining apparatus which can maintain the inclination direction of a nozzle with respect to a machining program route even during modification of the tool diameter correction amount, and which can improve machining accuracy. This control device 1 for a laser machining apparatus comprises: a tool center route calculation unit 12 which calculates a tool center route on the basis of an offset vector with respect to a machining program route; a first inclination direction calculation unit 131 which calculates an inclination direction of a nozzle 2 with respect to the machining program route; a tool orientation calculation unit 14 which calculates an orientation of the nozzle 2 on the basis of the inclination direction of the nozzle 2 calculated by the first inclination direction calculation unit 131 and an inclination angle of the nozzle 2 in the inclination direction from a direction that is perpendicular to a plane of a workpiece W in a plane orthogonal to the machining program route; a drive shaft movement amount (Continued)

calculation unit 15 which calculates a movement amount of a drive shaft on the basis of the tool center route and the orientation of the nozzle 2; and a drive shaft control unit 16 which controls the drive shaft on the basis of the movement amount of the drive shaft.

4 Claims, 10 Drawing Sheets

(58) Field of Classification Search
USPC ........................................................ 219/121.8
See application file for complete search history.

(56) References Cited

U.S. PATENT DOCUMENTS

| | | | | |
|---|---|---|---|---|
| 2007/0250206 A1* | 10/2007 | Otsuki | ............... | G05B 19/4103 |
| | | | | 700/189 |
| 2016/0306341 A1* | 10/2016 | Chen | ...................... | G05B 19/41 |

FOREIGN PATENT DOCUMENTS

| | | | |
|---|---|---|---|
| DE | 10 2016 213 540 A1 | 1/2018 |
| JP | H05-019825 A | 1/1993 |
| JP | H11-221719 A | 8/1999 |
| JP | 2004-174586 A | 6/2004 |
| JP | 2005-081434 A | 3/2005 |
| JP | 2007-275974 A | 10/2007 |
| JP | 2007-293522 A | 11/2007 |
| JP | 2016-540334 A | 12/2016 |
| JP | 2017-049877 A | 3/2017 |

* cited by examiner

‹-------- TOOL CENTER PATH

◀——— PROGRAM PATH

—·—·— LOCUS OF ROOT OF TOOL

←------- TOOL CENTER PATH

←——— PROGRAM PATH

———·——·— LOCUS OF ROOT OF TOOL

RADIUS COMPENSATION
AMOUNT

Z DIRECTION (PERPENDICULAR DIRECTION)

INCLINATION ANGLE=60

2

Y DIRECTION
(INCLINATION DIRECTION)

X DIRECTION
(ADVANCING DIRECTION)     90°   WITH RESPECT TO
ADVANCING DIRECTION

2

MACHINING PROGRAM
PATH
AND
TOOL CENTER PATH

AUTOMATICALLY ROTATE

INCLINATION DIRECTION CHANGES WITH ADVANCING DIRECTION

TOOL RADIUS COMPENSATION FUNCTION ON

MACHINING PROGRAM PATH

TOOL CENTER PATH

CHANGE OF INCLINATION ANGLE

TOOL RADIUS COMPENSATION FUNCTION ON

MACHINING PROGRAM PATH

TOOL CENTER PATH

CHANGE OF
INCLINATION ANGLE

CHANGE OF
INCLINATION ANGLE

2

LA

TOOL CENTER PATH

PROGRAM PATH

INCLINATION DIRECTION IS ALWAYS
PERPENDICULAR TO TANGENT

2

START POINT

PROGRAM PATH
AND
TOOL CENTER PATH

DIFFERENCE
IN SLOPE

PROGRAM PATH

2

TOOL CENTER PATH
START POINT

START POINT
PROGRAM PATH

2

TOOL CENTER
PATH

END POINT

CASE OF FOLLOWING
TOOL CENTER PATH

CASE OF FOLLOWING
PROGRAM PATH

RADIUS
DIFFERENCE
IS LARGER

CONTROL DEVICE FOR LASER MACHINING APPARATUS

TECHNICAL FIELD

The present disclosure relates to a controller for a laser machine.

BACKGROUND ART

Conventionally, in groove machining by a laser machine, an inclination direction of a nozzle with respect to an advancing direction of the nozzle is controlled. The inclination direction of the nozzle is set, for example, to a direction inclined by 90 degrees with respect to the advancing direction of the nozzle, and in this case, so-called normal direction control becomes possible.

Further, in the groove machining by the laser machine, an inclination angle in the inclination direction of the nozzle is controlled from a direction perpendicular to a plane of a workpiece to be machined in a plane orthogonal to the advancing direction of the nozzle. The inclination angle of the nozzle is controlled depending on a machining shape, for example.

For example, a technique is proposed in Japanese Unexamined Patent Application, Publication No. 2007-275974 in which groove machining is performed with an NC laser cutting machine in order to cut out a member having a groove. Japanese Unexamined Patent Application, Publication No. 2007-275974 discloses that an inclination angle of a laser head (nozzle) is changed at the time of groove machining of a curved portion.

Patent Document 1: Japanese Unexamined Patent Application, Publication No. 2007-275974

DISCLOSURE OF THE INVENTION

Problems to be Solved by the Invention

By the way, the inclination angle of the nozzle may be changed depending on the machining shape by a program command. When the inclination angle of the nozzle is changed, an irradiation zone of a laser on the workpiece to be machined changes. For this reason, an irradiation distance of the laser is adjusted by a tool radius compensation function usually provided in the controller for the laser machine. In other words, when the tool radius compensation is performed, a tool center path through which a center of the nozzle passes becomes a path different from a machining program path.

However, the inclination direction of the nozzle is automatically controlled so as to be always constant as an inclination direction with respect to the tool center path, but when the tool radius compensation amount is changed, the advancing direction of the tool center path changes and the inclination direction of the nozzle changes accordingly. For this reason, there is a disadvantage that the inclination direction of the nozzle with respect to the machining program path changes and the machine accuracy is reduced.

Therefore, a controller for a laser machine is preferably provided that is capable of maintaining the inclination direction of the nozzle with respect to the machining program path even when the tool radius compensation amount is changed and improving the machine accuracy.

Means for Solving the Problems

An aspect of the present disclosure provides a controller for a laser machine including a nozzle, the controller including: a tool center path calculation unit that creates an offset vector for a machining program path based on an analysis result of a machining program and calculates a tool center path, through which a center of the nozzle passes, based on the offset vector; a first inclination direction calculation unit that calculates an inclination direction of the nozzle with respect to the machining program path based on the analysis result of the machining program; a tool posture calculation unit that calculates a posture of the nozzle based on the inclination direction of the nozzle calculated by the first inclination direction calculation unit and an inclination angle in the inclination direction of the nozzle from a direction perpendicular to a plane of a workpiece in a plane orthogonal to the machining program path; a drive axis stroke calculation unit that calculates a stroke of a drive axis based on the tool center path calculated by the tool center path calculation unit and the posture of the nozzle calculated by the tool posture calculation unit; and a drive axis control unit that controls the drive axis based on the stroke of the drive axis calculated by the drive axis stroke calculation unit.

Effects of the Invention

According to the present disclosure, it is possible to provide the controller for a laser machine capable of maintaining the inclination direction of the nozzle with respect to the machining program path even when the tool radius compensation amount is changed and improving the machine accuracy.

PREFERRED MODE FOR CARRYING OUT THE INVENTION

Hereinafter, an embodiment of the present disclosure will be described in detail with reference to the drawings.

Figure 1:
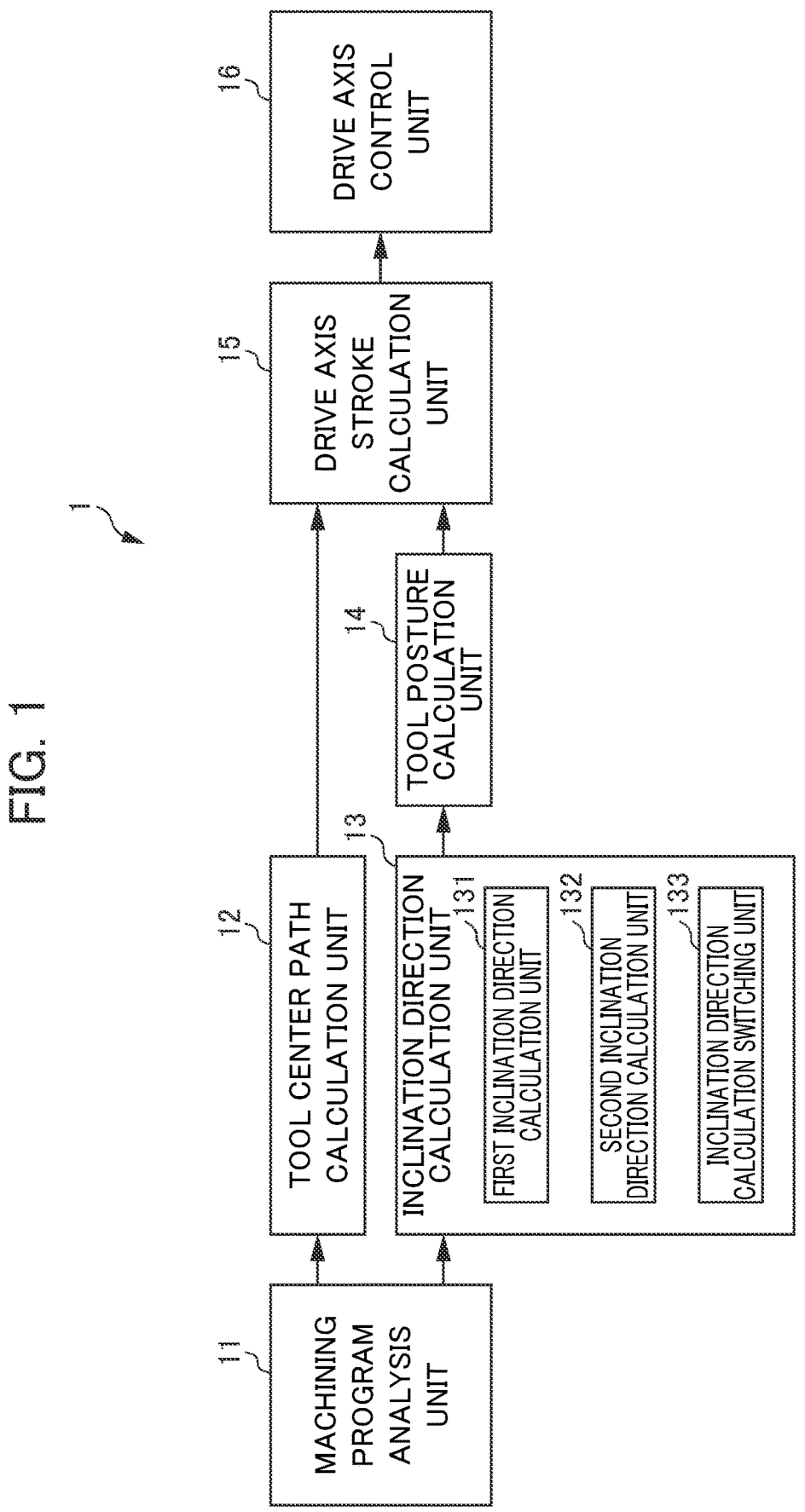
FIG. 1 is a functional block diagram showing a configuration of a controller for a laser machine according to an embodiment of the present disclosure.

FIG. 1 is a functional block diagram showing a configuration of a controller 1 for a laser machine according to an embodiment of the present disclosure. The controller 1 for the laser machine according to the present embodiment causes the laser machine to execute groove machining on a workpiece to be machined and to machine the workpiece into a member having a groove.

Figure 2:
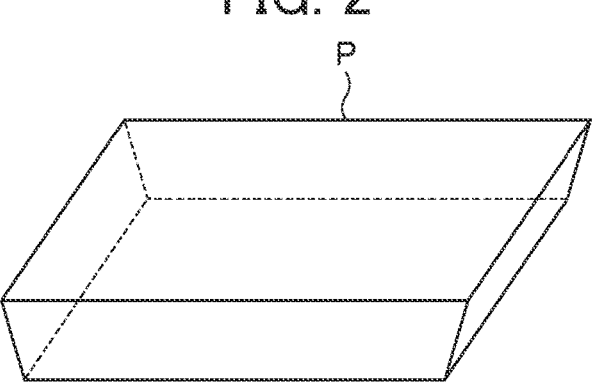
FIG. 2 is a view for describing groove machining, and is a perspective view of a groove machining-finished product.

Here, the groove machining by the laser machine will be described in detail with reference to FIGS. 2 to 6. FIG. 2 is a view for describing the groove machining, and is a perspective view of a groove machining-finished product P. In the example shown in FIG. 2, the groove machining-finished product P has a truncated quadrangular pyramid shape in which four side surfaces are inclined outward toward an upper surface. A groove constituted by these inclined surfaces forms a groove during laser welding.

Figure 3:
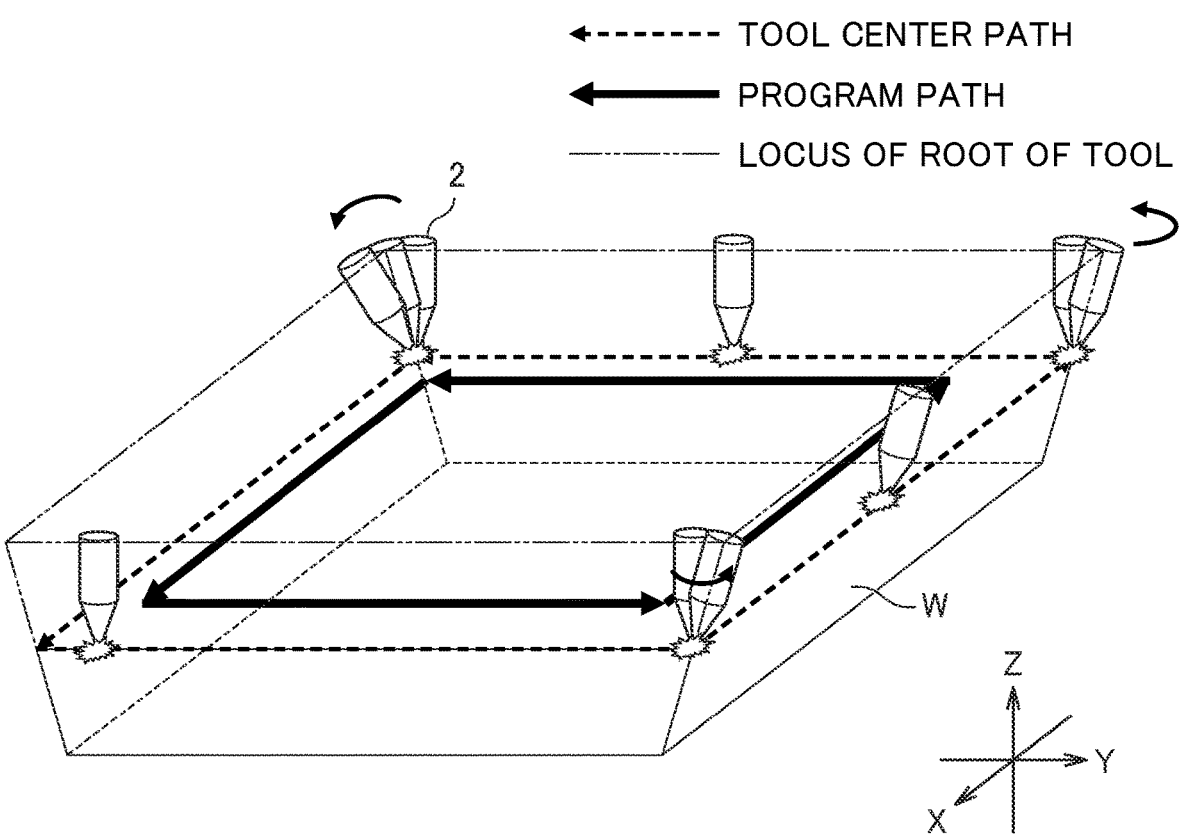
FIG. 3 is a view for describing the groove machining, and is a perspective view showing a posture and a locus of a nozzle during the groove machining.
Figure 4:
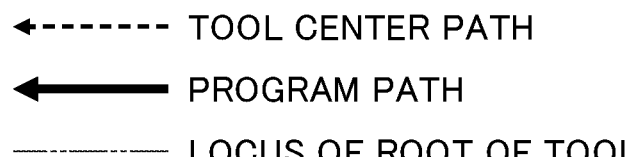
FIG. 4 is a view for describing the groove machining, and is a plan view showing a locus of the nozzle during the groove machining.
Figure 4:
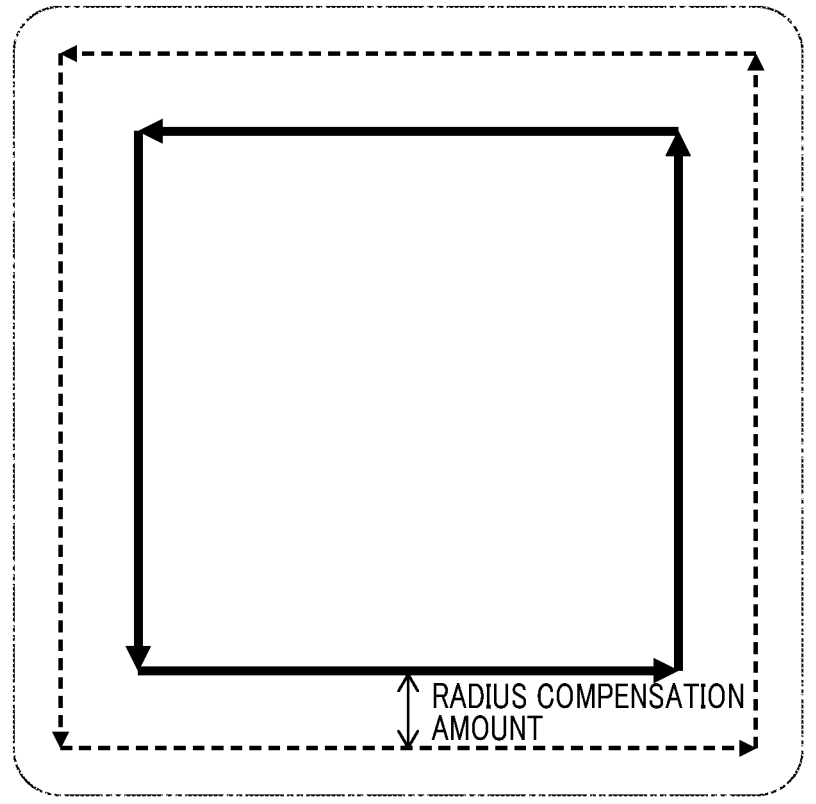

FIG. 3 is a view for describing the groove machining, and is a perspective view showing a posture and a locus of a nozzle 2 during the groove machining. Further, FIG. 4 is a view for describing the groove machining, and is a plane view showing a locus of the nozzle 2 during the groove machining. The examples shown in FIGS. 3 and 4 show the locus of the nozzle 2 when a workpiece W is machined on the groove machining-finished product shown in FIG. 2.

As shown in FIGS. 3 and 4, the nozzle 2 is moved in a rectangular shape on a surface of the workpiece W. At this time, the nozzle 2 is inclined in an advancing direction of the nozzle 2. In the examples shown in FIGS. 3 and 4, the inclination direction of the nozzle 2 is direction (an X direction or a Y direction in FIG. 3) inclined by 90 degrees with respect to the advancing direction and a direction inclined outward. Further, in the examples shown in FIGS. 3 and 4, an inclination angle in the inclination direction of the nozzle 2 is set to 45 degrees from a direction (a Z direction in FIG. 3) perpendicular to the surface (plane) of the workpiece W in a plane orthogonal to the advancing direction of the nozzle 2.

Figure 5:
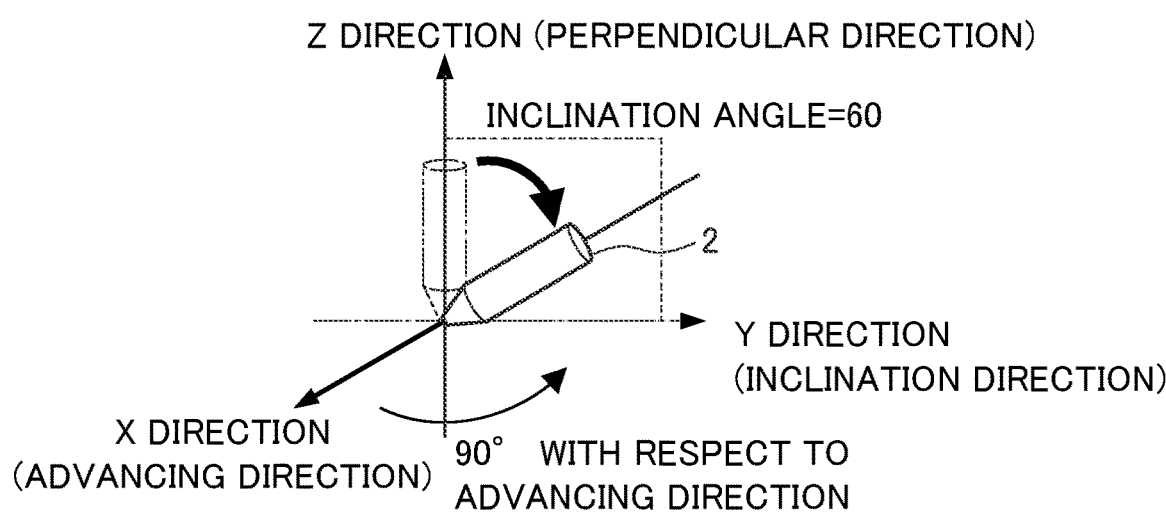
FIG. 5 is a view showing an inclination direction and an inclination angle of the nozzle during the groove machining.

The inclination direction and the inclination angle of the nozzle 2 will be described in more detail with reference to FIG. 5. FIG. 5 is a view showing the inclination direction and the inclination angle of the nozzle 2 during the groove machining. In the example shown in FIG. 5, the inclination direction of the nozzle 2 is a direction, that is, the Y direction that rotates 90 degrees with respect to the X direction, which is the advancing direction of the nozzle 2. Further, the inclination angle in the Y direction as the inclination direction of the nozzle 2 is set to 60 degrees from the Z direction, which is a direction perpendicular to the surface (XY plane) of the workpiece W, in a plane orthogonal to the X direction, which is the advancing direction of the nozzle 2, that is, in a YZ plane. As described above, the inclination direction and the inclination angle of the nozzle 2 are controlled in the groove machining.

Here, the inclination angle of the nozzle 2 may be changed depending on a machining shape by a machining program command. When the inclination angle of the nozzle 2 is changed, an irradiation zone of the laser on the workpiece W to be machined changes. Therefore, an irradiation distance of the laser is adjusted by a tool radius compensation function normally provided in the controller 1 for the laser machine. In other words, when the tool radius compensation is performed, as shown in FIGS. 3 and 4, a tool center path through which a center of the nozzle 2 passes is offset from a machining program path, and both the paths become different paths. Such an offset amount is a tool radius compensation amount.

Figure 6:
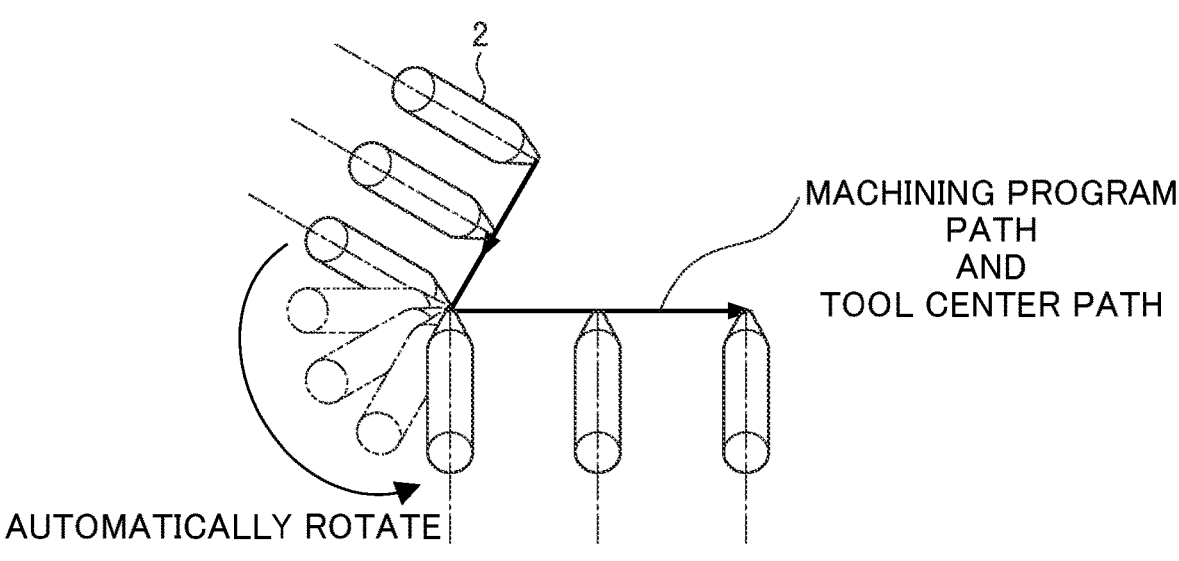
FIG. 6 is a view showing a posture and a locus of the nozzle when a tool radius compensation is not executed in the groove machining.

FIG. 6 is a view showing a posture and a locus of the nozzle 2 when the tool radius compensation is not executed in the groove machining. FIG. 6 shows a posture and a locus of the nozzle 2 as seen from the XY plane. In the example shown in FIG. 6, the tool radius compensation is not executed, and the machining program path and the tool center path coincide with each other. Then, since the inclination direction of the nozzle 2 with respect to the machining program path is controlled to be always constant even in bent corners of these paths, the nozzle 2 automatically rotates, and the inclination direction of the nozzle 2 is maintained.

Figure 7:
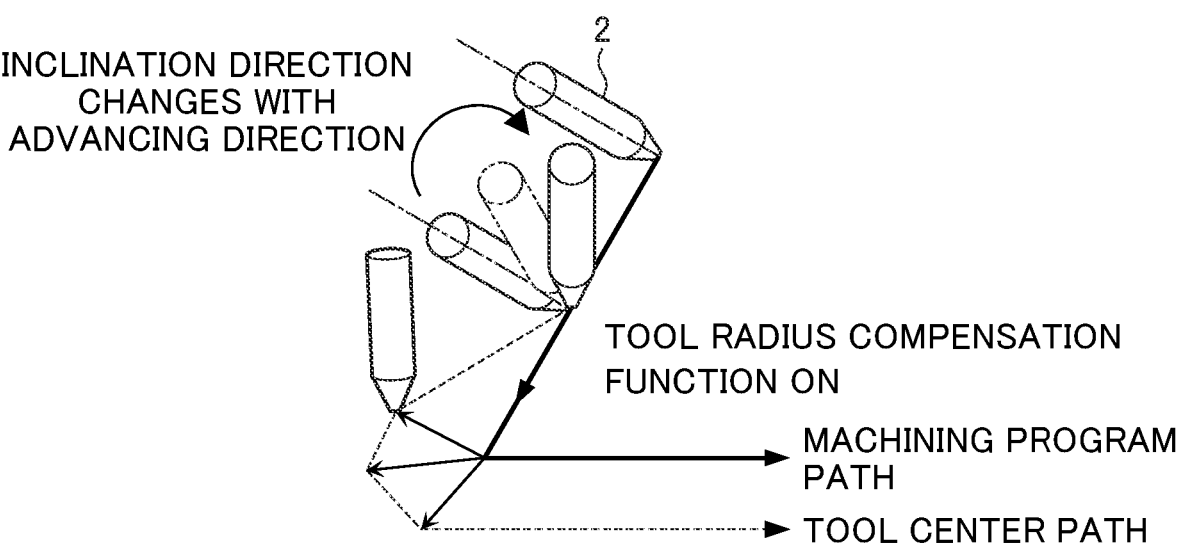
FIG. 7 is a view showing a posture and a locus of the nozzle to be controlled by a conventional controller when the tool radius compensation is executed in the groove machining.

FIG. 7 is a view showing a posture and a locus of the nozzle 2 to be controlled by a conventional controller when the tool radius compensation is executed in the groove machining. As shown in FIG. 7, the inclination direction of the nozzle 2 to be controlled by the conventional controller is automatically controlled so as to be always constant as an inclination direction with respect to the tool center path, but when the tool radius compensation amount is changed (the tool radius compensation function being ON) according to a change in the inclination angle of the nozzle 2 depending on the machining shape, the advancing direction of the tool center path changes and the inclination direction of the nozzle 2 changes accordingly. For this reason, there arises a problem that the inclination direction of the nozzle with respect to the machining program path changes and the machine accuracy is reduced.

Therefore, the controller 1 for the laser machine according to the present embodiment is to solve the problem described above. Hereinafter, a configuration of the controller 1 for the laser machine according to the present embodiment will be described in detail.

Returning to FIG. 1, the controller 1 for the laser machine according to the present embodiment includes a machining program analysis unit 11, a tool center path calculation unit 12, an inclination direction calculation unit 13, a tool posture calculation unit 14, a drive axis stroke calculation unit 15, and a drive axis control unit 16.

The controller 1 for the laser machine according to the present embodiment is implemented by, for example, reading a program that causes a computer including a CPU and a memory to execute laser machining according to the present embodiment. The controller 1 for the laser machine according to the present embodiment includes a numerical controller and a servo controller.

The machining program analysis unit 11 analyzes a machining program to be input. Specifically, the machining program analysis unit 11 analyzes the machining program to acquire machining information, for example, a machining program path, information on an inclination direction of the nozzle, and an inclination angle of the nozzle.

The tool center path calculation unit 12 creates an offset vector for the machining program path based on the analysis result of the machining program by the machining program analysis unit 11, and calculates the tool center path, through which the center of the nozzle passes, based on the offset vector. The tool center path calculation unit 12 calculates the tool center path that is offset from the machining program path (offset by a tool radius from the machining program path), and thus the tool radius can be compensated.

The inclination direction calculation unit 13 includes a first inclination direction calculation unit 131, a second inclination direction calculation unit 132, and an inclination direction calculation switching unit 133.

The first inclination direction calculation unit 131 calculates the inclination direction of the nozzle with respect to the machining program path based on the analysis result of the machining program by the machining program analysis unit 11. Specifically, based on the information on the inclination direction of the nozzle 2 (a rotation angle with respect to the advancing direction of the nozzle 2) acquired by the machining program analysis unit 11, the inclination direction of the nozzle 2 with respect to the machining program path is calculated.

The second inclination direction calculation unit 132 calculates the inclination direction of the nozzle with respect to the tool center path based on the analysis result of the machining program by the machining program analysis unit 11. Specifically, based on the information on the inclination direction of the nozzle 2 (a rotation angle with respect to the advancing direction of the nozzle 2) acquired by the machining program analysis unit 11, the inclination direction of the nozzle 2 with respect to the tool center path is calculated.

The inclination direction calculation switching unit 133 switches between the calculation of the inclination direction of the nozzle 2 with respect to the machining program path by the first inclination direction calculation unit 131 and the calculation of the inclination direction of the nozzle 2 with respect to the tool center path by the second inclination direction calculation unit 132, depending on the shape of the machining program path. Specifically, the inclination direction calculation switching unit 133 switches to the calculation of the inclination direction of the nozzle 2 with respect to the tool center path by the second inclination direction calculation unit 132 when the shape of the machining program path is a circular arc shape. The switching of the calculation of the inclination direction by the inclination direction calculation switching unit 133 will be described in detail below.

The inclination direction of the nozzle 2 with respect to the machining program path is preferably a direction orthogonal to the machining program path. Similarly, the inclination direction of the nozzle 2 with respect to the tool center path is preferably a direction orthogonal to the tool center path. This enables so-called normal direction control.

The tool posture calculation unit 14 calculates a posture of the nozzle 2, based on the inclination direction of the nozzle 2 calculated by the first inclination direction calculation unit

131 or the second inclination direction calculation unit 132 and the inclination angle in the inclination direction of the nozzle 2 from the direction perpendicular to the plane of the workpiece W in the plane orthogonal to the machining program path.

The drive axis stroke calculation unit 15 calculates a stroke of a drive axis, based on the tool center path calculated by the tool center path calculation unit 12 and the posture of the nozzle 2 calculated by the tool posture calculation unit 14.

The drive axis control unit 16 controls the drive axis based on the stroke of the drive axis calculated by the drive axis stroke calculation unit 15.

Next, a description will be given in detail with respect to an operation of the nozzle 2 of the laser machine to be controlled by the controller 1 for the laser machine according to the present embodiment.

Figure 8:
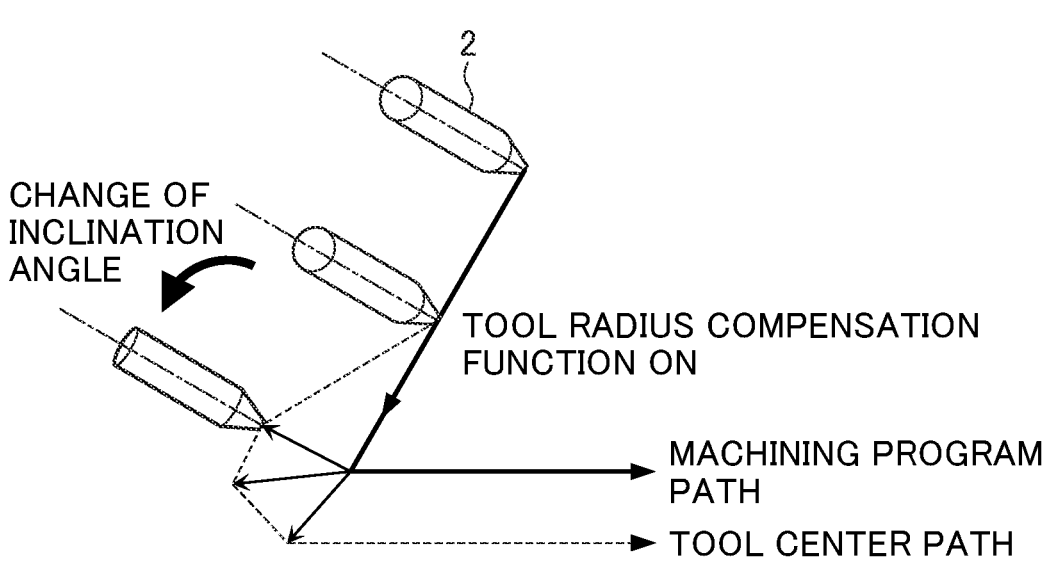
FIG. 8 is a view showing a posture and a locus of the nozzle to be controlled by the controller according to the present embodiment when the tool radius compensation is executed in the groove machining.

FIG. 8 is a view showing a posture and a locus of the nozzle 2 to be controlled by the controller 1 according to the present embodiment when the tool radius compensation is executed in the groove machining. As shown in FIG. 8, the controller 1 according to the present embodiment controls the inclination direction of the nozzle 2 as the inclination direction with respect to the machining program path when the tool radius compensation amount is changed (the tool radius compensation function being ON) as the inclination angle of the nozzle 2 is changed depending on the machining shape. For this reason, since the inclination direction of the nozzle 2 with respect to the machining program path is always kept constant, the machine accuracy can be improved.

Figure 9:
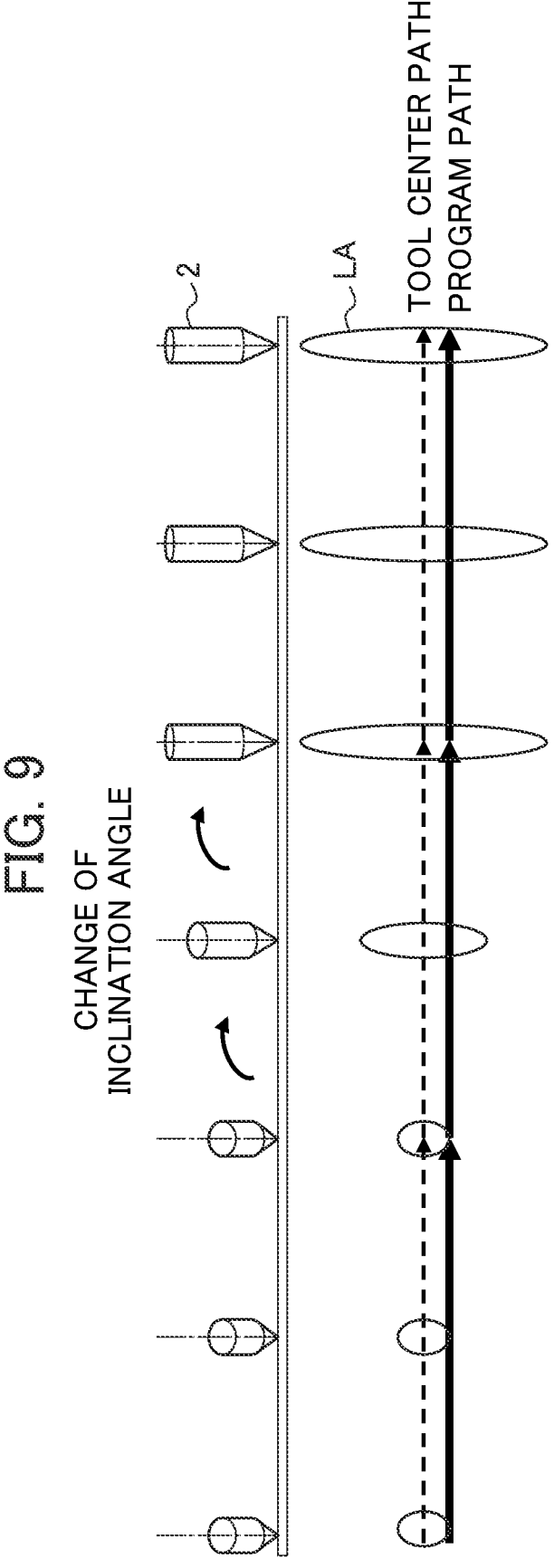
FIG. 9 is a view showing a laser irradiation zone when the inclination angle of the nozzle is changed in the groove machining.

FIG. 9 is a view showing a laser irradiation zone LA when the inclination angle of the nozzle 2 is changed in the groove machining. FIG. 9 shows a case where the tool radius compensation is OFF, and the machining program path and the tool center path originally coincide with each other, but for convenience, both the paths are shifted from each other in FIG. 9. As shown in FIG. 9, it can be seen that the irradiation zone LA of the laser is widened when the inclination angle of the nozzle 2 is changed, specifically, when a slope of the posture of the nozzle 2 is increased.

Figure 10:
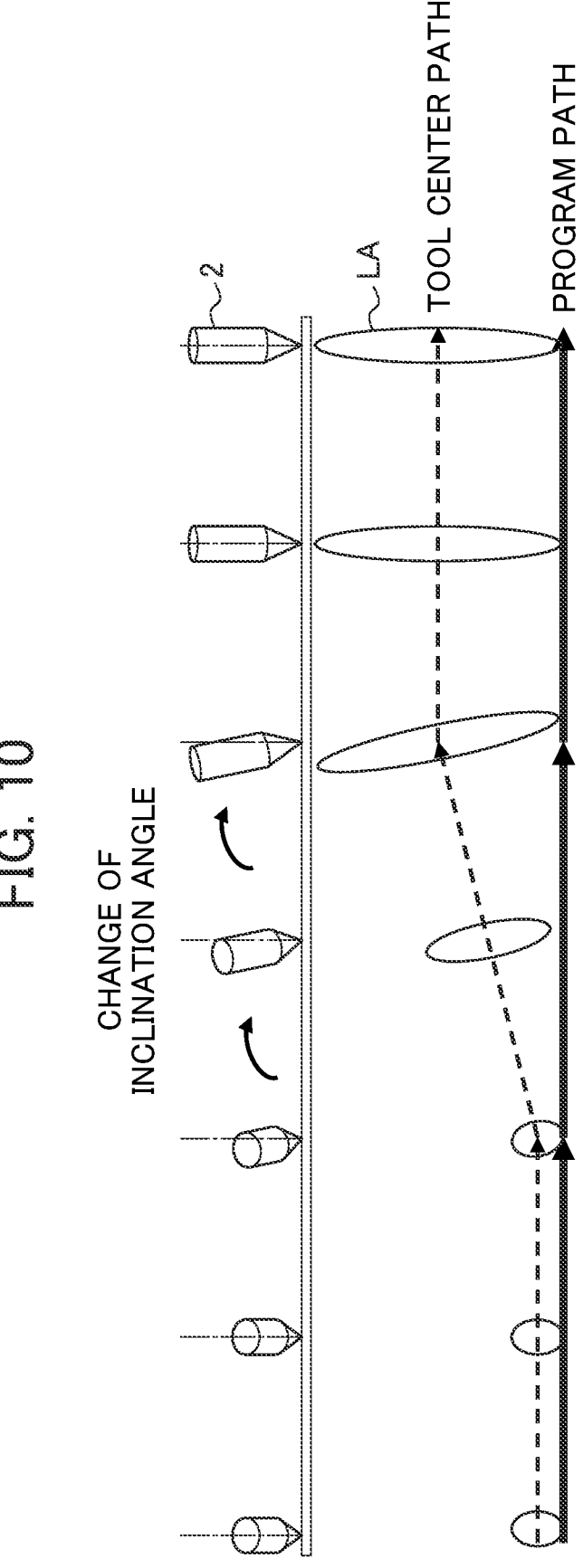
FIG. 10 is a view showing a conventional laser irradiation zone when the tool radius compensation is executed in the groove machining.

On the other hand, FIG. 10 is a view showing a conventional laser irradiation zone LA when the tool radius compensation is executed in the groove machining. Conventionally, when the inclination angle of the nozzle 2 is changed and the tool radius compensation is turned ON, the inclination direction of the nozzle 2 is controlled in the inclination direction with respect to the tool center path which is offset from the machining program path, whereby it can be seen that the inclination direction changes with the tool center path and a way of hitting a laser on the workpiece W also changes. Thus, the laser irradiation zone LA also changes significantly, which causes a decrease in machine accuracy.

Figure 11:
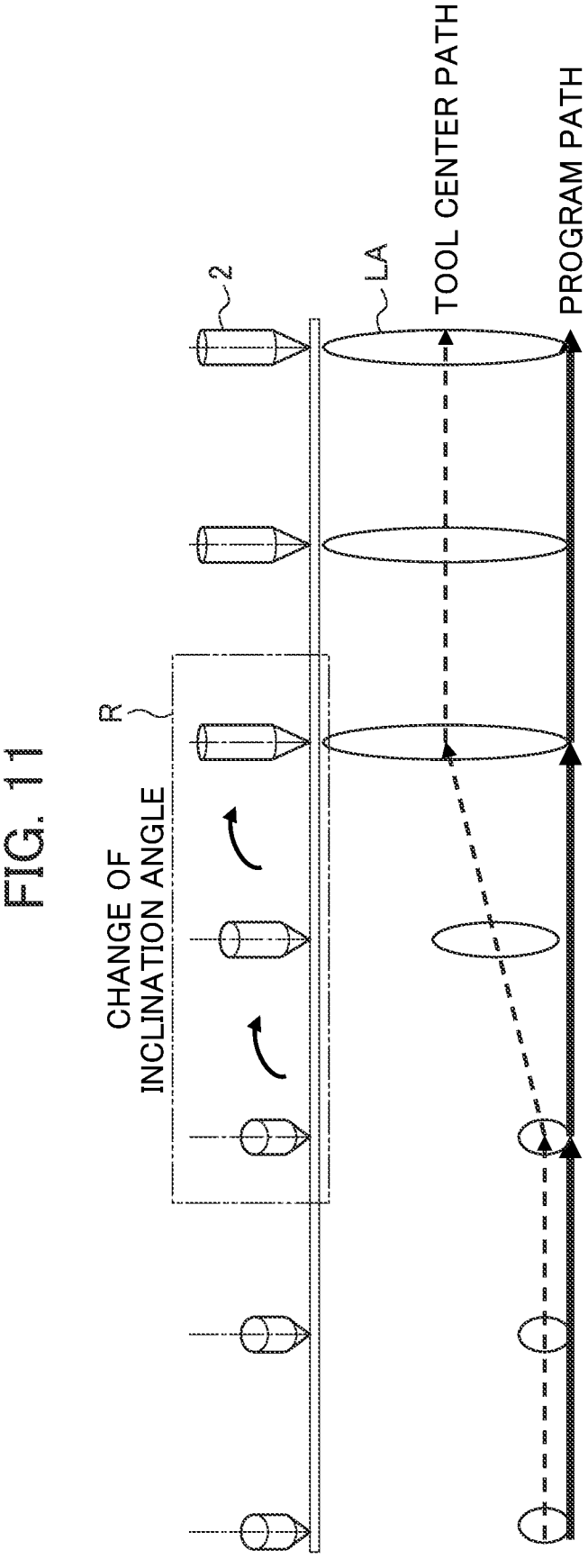
FIG. 11 is a view showing a laser irradiation zone of the present embodiment when the tool radius compensation is executed in the groove machining.

On the other hand, FIG. 11 is a view showing a laser irradiation zone LA of the present embodiment when the tool radius compensation is executed in the groove machining. As shown in FIG. 11, when the inclination angle of the nozzle 2 is changed and the tool radius compensation is turned ON, the inclination direction of the nozzle 2 is controlled in the inclination direction with respect to the machining program path, and thus the inclination direction of the nozzle 2 with respect to the machining program path is maintained. For this reason, a decrease in machine accuracy is avoided.

Next, the switching of the inclination direction calculation by the inclination direction calculation switching unit 133 will be described in detail with reference to FIGS. 12 to 15.

Figure 12:
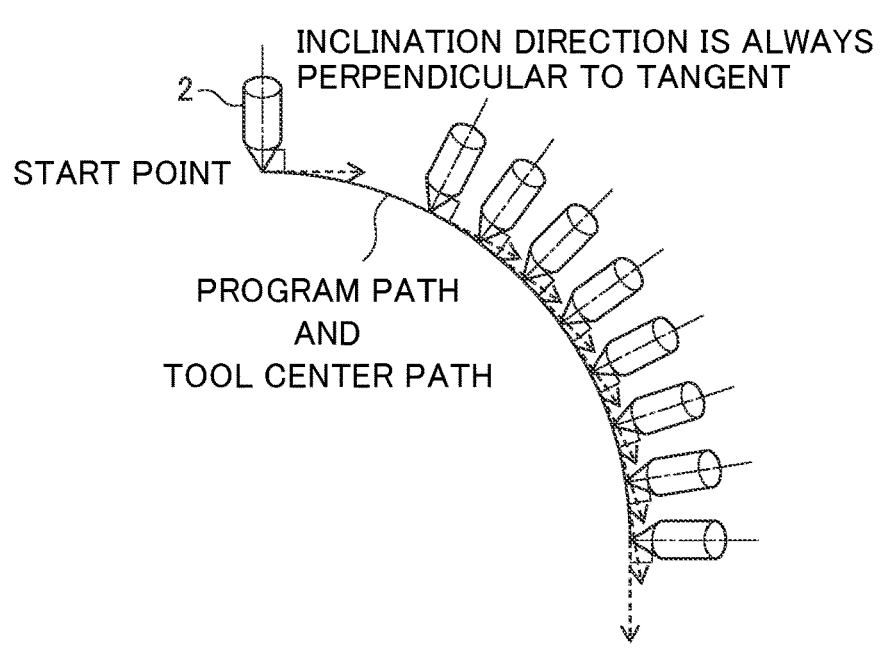
FIG. 12 is a view showing a locus of the nozzle when the tool radius compensation is not executed on a circular arc machining program path.

FIG. 12 is a view showing laser machining when the tool radius compensation is not executed on a circular arc machining program path. As shown in FIG. 12, when the groove machining is performed on the circular arc machining program path, the inclination direction is controlled and the groove machining is performed such that the inclination direction of the nozzle 2 is always perpendicular (in a normal direction) to a tangent of the circular arc. Since FIG. 12 shows a case where the tool radius compensation is not executed, the machining program path and the tool center path coincide with each other.

Figure 13:
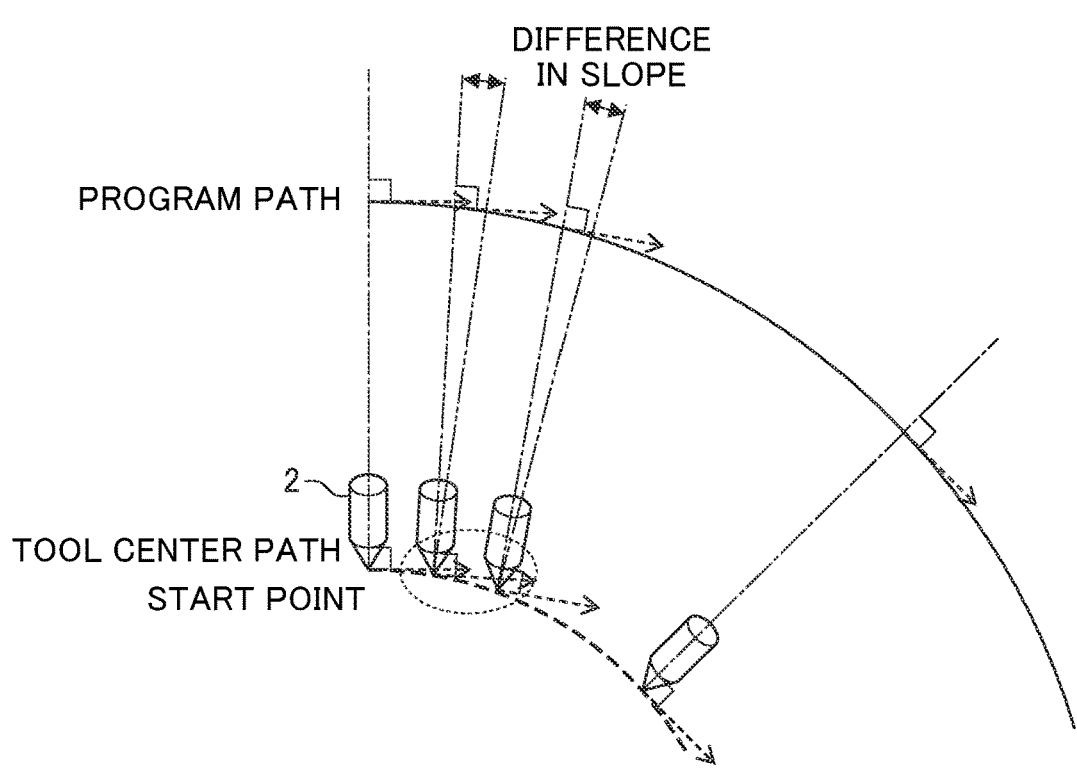
FIG. 13 is a view showing a locus of the nozzle when the tool radius compensation is executed on a circular arc machining program path and the inclination direction of the nozzle is set to an inclination direction with respect to the circular arc machining program path.

FIG. 13 is a view showing laser machining when the tool radius compensation is executed on a circular arc machining program path and the inclination direction of the nozzle is set to the inclination direction with respect to the circular arc machining program path. As shown in FIG. 13, when the nozzle 2 is moved on the tool center path with the inclination direction of the nozzle 2 as the inclination direction with respect to the machining program path, there is a difference in slope between a slope of a normal with respect to a tangent of the tool center path and a slope of a normal with respect to a tangent of the program path, near a start point and an end point of the path, in particular. At this time, even when the path is a perfect circle, the shape of the machined surface is not a perfect circle.

Figures 14, 15:
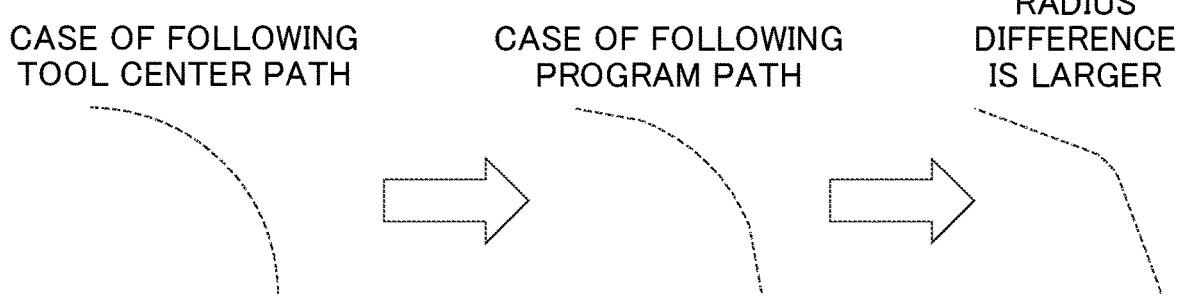
FIG. 14 is a view showing a locus of the nozzle when the tool radius compensation is executed on a circular arc machining program path and the inclination direction of the nozzle is set to an inclination direction with respect to the circular arc machining program path in a case where a radius difference from the tool center path is large.
FIG. 15 is a view showing a machining shape on a circular arc machining program path when the inclination direction of the nozzle is set to an inclination direction with respect to the tool center path and the inclination direction of the nozzle is set to an inclination direction with respect to the machining program path.

Further, FIG. 14 is a view showing laser machining when the tool radius compensation is executed on a circular arc machining program path and the inclination direction of the nozzle 2 is set to the inclination direction with respect to the circular arc machining program path in a case where a radius difference from the tool center path is large. FIG. 15 is a view showing a machining shape on a circular arc machining program path when the inclination direction of the nozzle 2 is set to the inclination direction with respect to the tool center path and the inclination direction of the nozzle 2 is set to the inclination direction with respect to the machining program path. As shown in FIGS. 14 and 15, when a radius difference between the machining program path and the tool center path is large, if the inclination direction of the nozzle 2 is set to the inclination direction with respect to the machining program path, it can be seen that the machining shape does not become a circular arc shape, and as the radius difference increases, the machining shape is no longer curved.

Therefore, in the present embodiment, the inclination direction calculation switching unit 133 switches between the calculation of the inclination direction of the nozzle 2 with respect to the machining program path and the calculation of the inclination direction of the nozzle 2 with respect to the tool center path, depending on the shape of the machining program path. In particular, when the shape of the machining program path is the circular arc shape as described above, the inclination direction calculation switching unit 133 switches to the calculation of the inclination direction of the nozzle 2 with respect to the tool center path. Thus, it is possible to improve the machine accuracy while maintaining a desired machining shape.

According to the controller 1 for the laser machine according to the present embodiment, the following effects are obtained. According to the present embodiment, the controller 1 includes: the tool center path calculation unit 12 that calculates the tool center path based on the offset vector; and the first inclination direction calculation unit 131 that calculates the inclination direction of the nozzle 2 with respect to the machining program path. Further, the controller 1 includes: the tool posture calculation unit 14 that calculates the posture of the nozzle 2 based on the calculated inclination direction of the nozzle 2 and the inclination angle in the inclination direction of the nozzle 2 from the direction perpendicular to the plane of the workpiece W in the plane orthogonal to the machining program path; the drive axis stroke calculation unit 15 that calculates the stroke of the drive axis based on the tool center path and the posture of the nozzle 2; and the drive axis control unit 16 that controls the drive axis based on the stroke of the drive axis. Thereby, even when the inclination angle of the nozzle is changed depending on the machining shape and the tool radius compensation amount is changed, the inclination direction of the nozzle 2 with respect to the machining program path can be maintained, and thus the machine accuracy can be improved.

Further, according to the present embodiment, the controller 1 includes the second inclination direction calculation unit 132 that calculates the inclination direction of the nozzle 2 with respect to the tool center path based on the analysis result of the machining program. Further, the controller 1 includes the inclination direction calculation switching unit 133 that switches between the calculation of the inclination direction of the nozzle 2 with respect to the machining program path by the first inclination direction calculation unit 131 and the calculation of the inclination direction of the nozzle 2 with respect to the tool center path by the second inclination direction calculation unit 132, depending on the shape of the machining program path. Thereby, since the inclination direction of the nozzle 2 can be switched between the calculation of the inclination direction of the nozzle 2 with respect to the tool center path and the calculation of the inclination direction of the nozzle 2 with respect to the machining program path, depending on the shape of the machining program path, it is possible to improve the machine accuracy while maintaining the machining shape.

Further, according to the present embodiment, the inclination direction calculation switching unit 133 is configured to switch to the calculation of the inclination direction of the nozzle 2 with respect to the tool center path by the second inclination direction calculation unit 132 when the shape of the machining program path is the circular arc shape. Thereby, it is possible to more reliably improve the machine accuracy while maintaining the machining shape.

Further, according to the present embodiment, the inclination direction of the nozzle 2 with respect to the machining program path is the direction orthogonal to the machining program path, and similarly, the inclination direction of the nozzle 2 with respect to the tool center path is the direction orthogonal to the tool center path. Thereby, so-called normal direction control becomes possible, and the machine accuracy can be improved.

The present disclosure is not limited to the above embodiment, and the present disclosure includes modifications and improvements within the range in which the object of the present disclosure can be achieved.

EXPLANATION OF REFERENCE NUMERALS 1 controller for laser machine
2 nozzle
11 machining program analysis unit
12 tool center path calculation unit
13 inclination direction calculation unit
131 first inclination direction calculation unit
132 second inclination direction calculation unit
133 inclination direction calculation switching unit
14 tool posture calculation unit

15 drive axis stroke calculation unit
16 drive axis control unit
LA laser irradiation zone
P groove machining-finished product
W workpiece

The invention claimed is:

1. A controller for a laser machine including a nozzle, the controller comprising:

a tool center path calculation unit that creates an offset vector for a machining program path based on an analysis result of a machining program and calculates a tool center path, through which a center of the nozzle passes, based on the offset vector;

a first inclination direction calculation unit that calculates an inclination direction of the nozzle with respect to the machining program path based on the analysis result of the machining program;

a tool posture calculation unit that calculates a posture of the nozzle based on the inclination direction of the nozzle calculated by the first inclination direction calculation unit and an inclination angle in the inclination direction of the nozzle from a direction perpendicular to a plane of a workpiece in a plane orthogonal to the machining program path;

a drive axis stroke calculation unit that calculates a stroke of a drive axis based on the tool center path calculated by the tool center path calculation unit and the posture of the nozzle calculated by the tool posture calculation unit;

a drive axis control unit that controls the drive axis based on the stroke of the drive axis calculated by the drive axis stroke calculation unit;

a second inclination direction calculation unit that calculates the inclination direction of the nozzle with respect to the tool center path based on the analysis result of the machining program; and an inclination direction calculation switching unit that switches between calculation of the inclination direction of the nozzle with respect to the machining program path by the first inclination direction calculation unit and calculation of the inclination direction of the nozzle with respect to the tool center path by the second inclination direction calculation unit, depending on a shape of the machining program path.

2. The controller for a laser machine according to claim 1, wherein the inclination direction calculation switching unit switches to the calculation of the inclination direction of the nozzle with respect to the tool center path by the second inclination direction calculation unit when the shape of the machining program path is a circular arc shape.

3. The controller for a laser machine according to claim 1, wherein the inclination direction of the nozzle with respect to the machining program path is a direction orthogonal to the machining program path, and the inclination direction of the nozzle with respect to the tool center path is a direction orthogonal to the tool center path.

4. The controller for a laser machine according to claim 2, wherein the inclination direction of the nozzle with respect to the machining program path is a direction orthogonal to the machining program path, and the inclination direction of the nozzle with respect to the tool center path is a direction orthogonal to the tool center path.

* * * * *